United States Patent [19]

Eliscu

[11] Patent Number: 4,577,827
[45] Date of Patent: Mar. 25, 1986

[54] CAMERA HOLDER APPARATUS

[75] Inventor: Joshua Eliscu, Tucson, Ariz.

[73] Assignee: Lois G. Langley, Tucson, Ariz.

[21] Appl. No.: 635,560

[22] Filed: Jul. 30, 1984

Related U.S. Application Data

[63] Continuation-in-part of Ser. No. 432,076, Sep. 30, 1982, abandoned, which is a continuation-in-part of Ser. No. 275,616, Jun. 22, 1981, abandoned, which is a continuation of Ser. No. 88,414, Oct. 26, 1979, abandoned.

[51] Int. Cl.[4] ............................................. F16M 13/00
[52] U.S. Cl. ..................................... 248/656; 248/662; 248/422; 248/183; 354/81
[58] Field of Search ............... 248/183, 371, 422, 651, 248/662, 669, DIG. 13, 656; 352/87, 243; 354/81, 293; 355/53

[56] References Cited

U.S. PATENT DOCUMENTS

| | | | |
|---|---|---|---|
| 710,561 | 10/1902 | Boyd | 248/422 X |
| 1,457,982 | 6/1923 | Makower | 248/183 |
| 2,198,006 | 4/1940 | Garity | 352/87 |
| 2,377,563 | 6/1945 | Luenberger et al. | 248/651 |
| 2,690,696 | 10/1954 | Ashton | 248/422 X |
| 3,099,934 | 8/1963 | Park | 248/662 X |
| 3,495,519 | 2/1970 | Alfsen et al. | 355/53 X |
| 4,214,823 | 7/1980 | Pritchard | 352/87 |

FOREIGN PATENT DOCUMENTS 1299882 12/1972 United Kingdom ................ 248/184

*Primary Examiner*—Ramon S. Britts
*Assistant Examiner*—Karen J. Chotkowski
*Attorney, Agent, or Firm*—H. Gordon Shields

[57] ABSTRACT

Camera holder apparatus includes a movable housing and a cage rotationally and longitudinally movable within the housing and a camera is secured to the movable cage for movement therewith and for rotation relative to the movable cage. The housing is removable for remote location filming. The housing is movable on a track or on a platform, and the platform is rotatable and tiltable for providing three axis positioning and movement for the camera.

10 Claims, 14 Drawing Figures

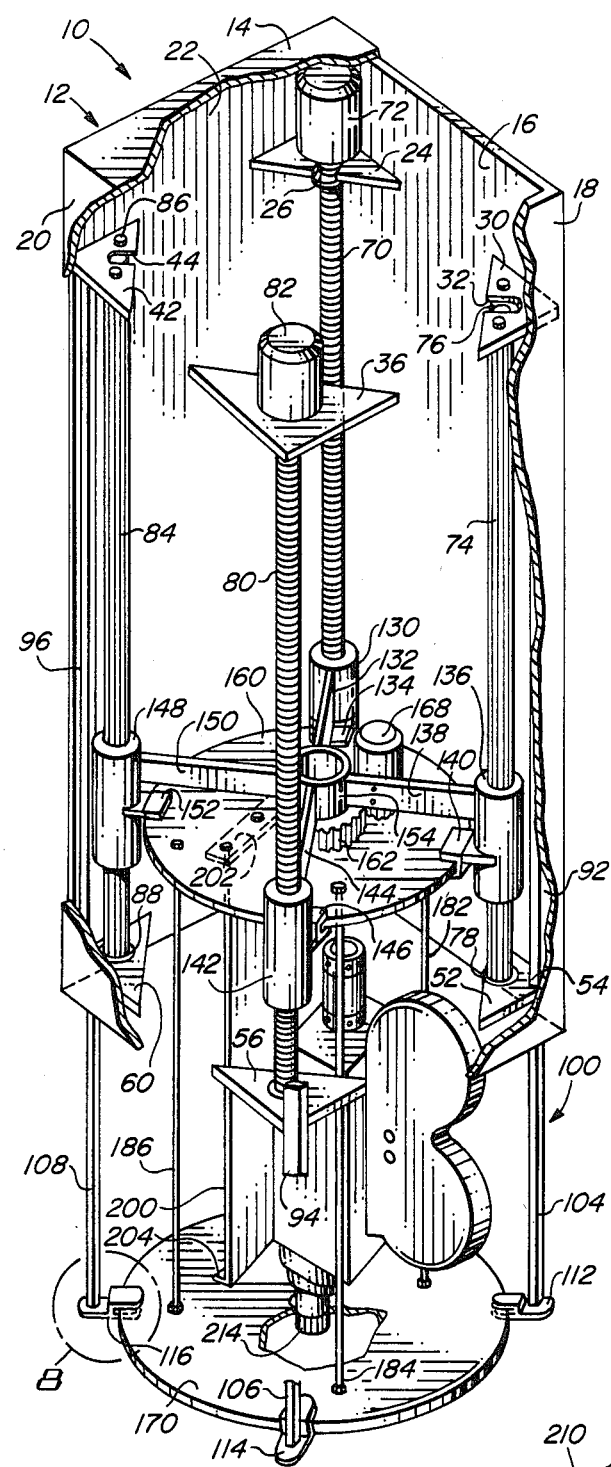
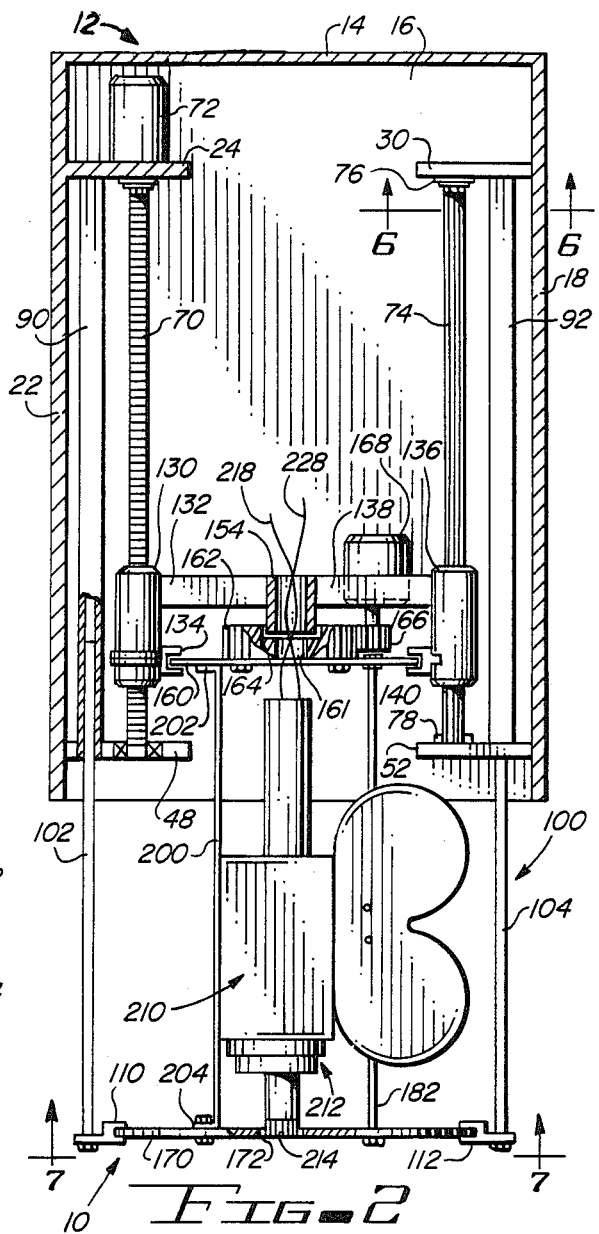
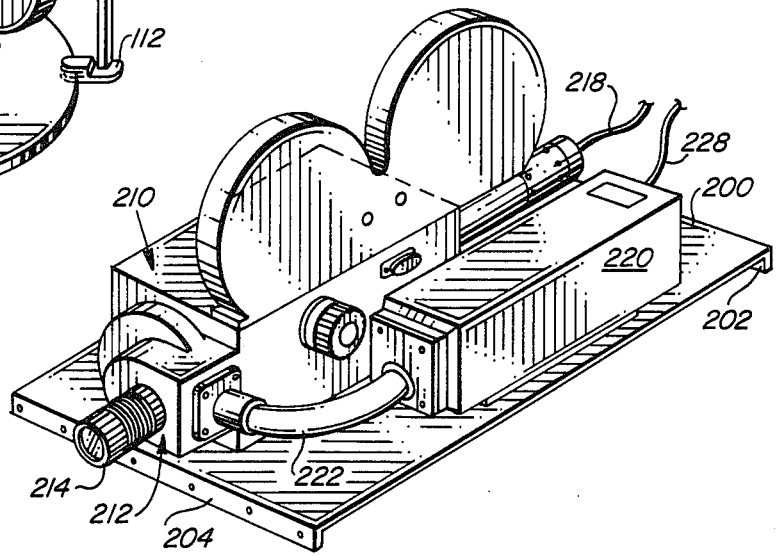
Fig-1
Fig-2
Fig-3

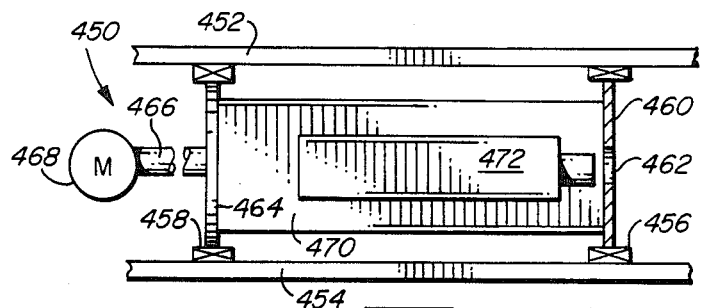
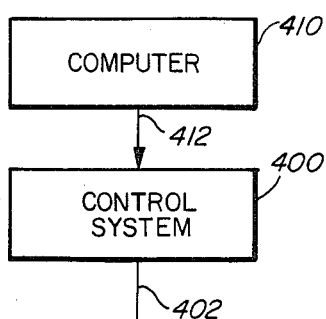
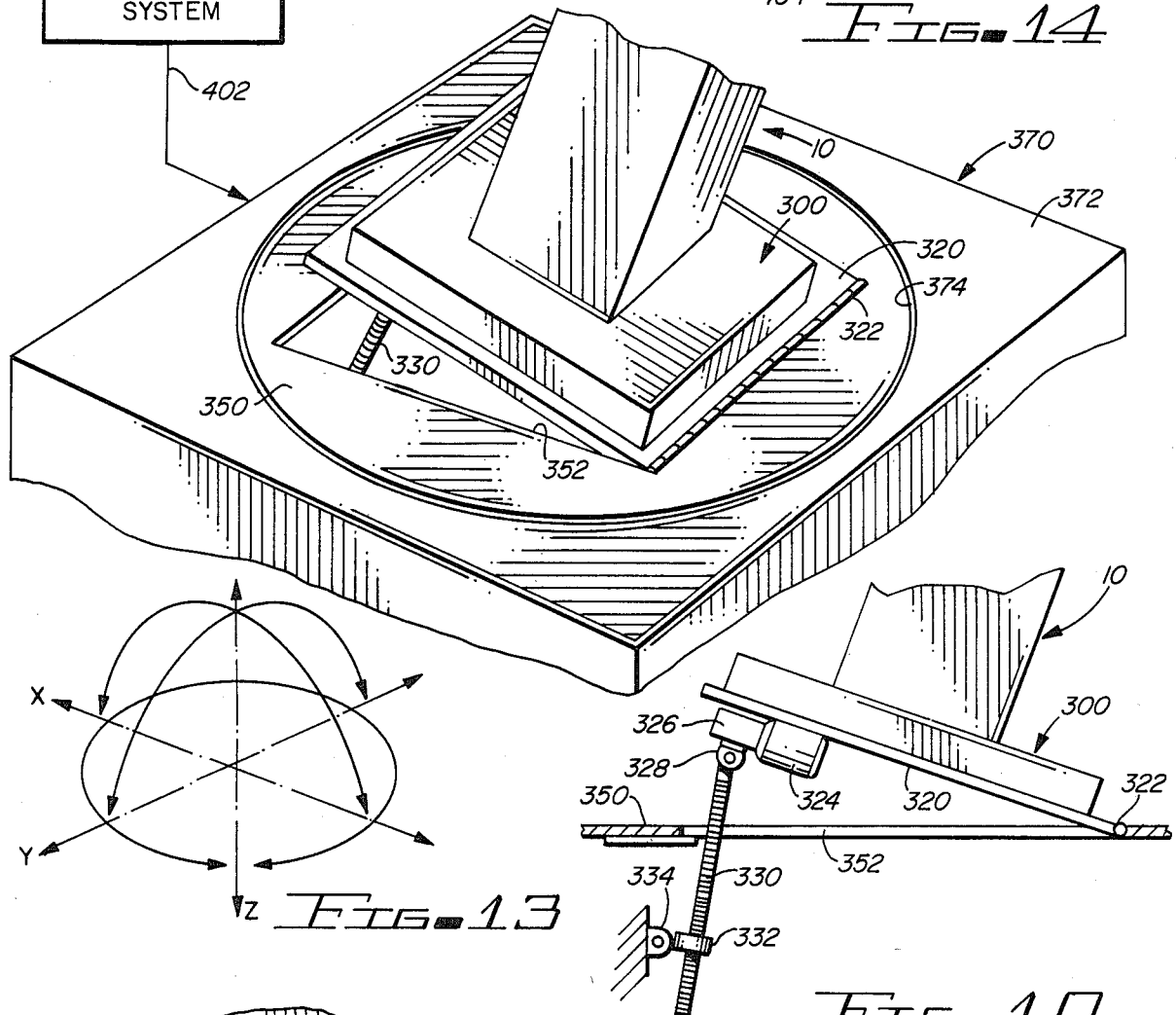
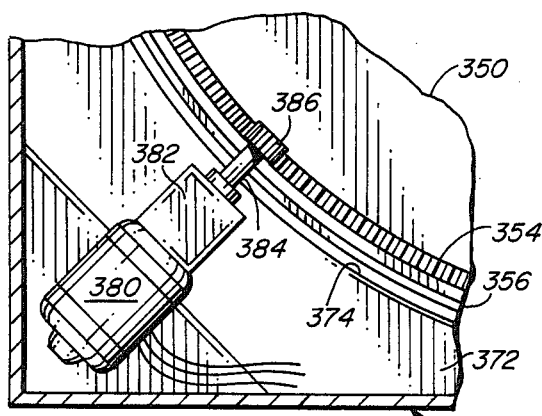
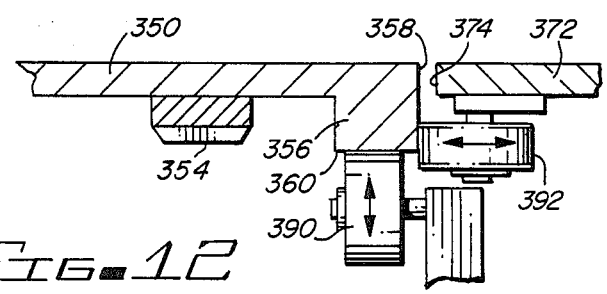

CAMERA HOLDER APPARATUS

CROSS-REFERENCE TO RELATED APPLICATIONS

This application is a continuation-in-part application of copending application Ser. No. 432,076, filed Sept. 30, 1982, now abandoned; which is a continuation-in-part of Ser. No. 275,616, filed June 22, 1981, now abandoned; and which is a continuation application of Ser. No. 88,414, filed Oct. 26, 1979, also now abandoned.

BACKGROUND OF THE INVENTION

1. Field of the Invention:

This invention relates to camera holder apparatus, and, more particularly, to camera holder apparatus for holding a motion picture and/or television camera for three axis movement with respect to an object to be photographed.

2. Description of the Prior Art:

Motion picture cameras of the prior art are typically secured to the piston of a centrally located and vertically extending cylinder for vertical movement. The camera is generally also pivotable or rotatable with respect to the cylinder. Another type of camera holder apparatus includes a movable boom to which the camera is secured. The boom pivots in two planes to move vertically and to move in an X-Y plane.

U.S. Pat. No. 2,198,006 discusses camera apparatus used for some types of animation. The apparatus includes a base frame fixed to a specific location with a camera platform movable through a pulley and counterweight system on telescoping tubes. There are different levels secured to the base for holding cels, etc. The camera platform rotates on an X-Y table. The use of pulleys and counterweights doubles the weight of the camera platform and thus increases gravity problems, but is used presumably to help overcome vibration problems.

By eliminating extra weight, such as counterweights, movement of camera turret or camera holder may be speeded up with less power required. Moreover, the lighter the camera turret, the less the effect of inertia forces for the starting and stopping of both vertical and rotational movement.

For animation purposes and for other photographic requirements or purposes, it is highly desirable that a camera is able to be precisely located in three planes, namely an X plane, a Y plane, and a Z or vertical plane. The different types of apparatus of the prior art, as discussed above, have limitations with respect to the precision positioning of a camera, as for example for special effects photography or for animation photography. This is particularly true with respect to the ability, or to the lack of ability, of cameras in the prior art to rotate 360° or more from a fixed location.

It will be noted that with respect to the prior art animation cameras, the teaching of the prior art is that a camera must be mounted on substantially immovable or non-portable columns and that only limited types of movement are possible. That is, a camera must be mounted on, or surrounded and supported by, substantially immovable and non-portable columns which will insure rigidity. The apparatus of the present invention includes a non-rigid and completely freely-mountable structure on which a camera is located. The structure may be used in the studio, it may be taken on location, mounted vertically, or horizontally, etc. The combination thus provides flexibility in a camera and an end result in photography not contemplated nor suggested by the prior art.

SUMMARY OF THE INVENTION

The apparatus described and claimed herein comprises camera holder apparatus movable in three axes, including tilting and rotating. Linear movement is accomplished by securing the camera to a longitudinally movable cage, and the rotational movement is accomplished by securing the camera within the cage to a rotatable plate. In addition, the cage may be secured to a tiltable base on a rotatable disc mount.

Among the objects of the present invention are the following:

To provide new and useful camera holder apparatus;

To provide new and useful apparatus for moving a camera longitudinally;

To provide new and useful apparatus for rotating a camera about a fixed axis;

To provide new and useful apparatus for moving a camera in a plurality of planes substantially simultaneously;

To provide new and useful apparatus for holding a movie camera and a television camera for longitudinal and rotational movement;

To provide new and useful apparatus for rotating a camera at high speed;

To provide new and useful apparatus for holding and moving a camera in three planes;

To provide new and useful camera holder apparatus movable in precision increments vertically and rotationally; and To provide new and useful camera apparatus for holding a pair of cameras side by side and for simultaneously moving the cameras.

BRIEF DESCRIPTION OF THE DRAWING

FIG. 1 comprises a perspective view, with a portion broken away, of the apparatus of the present invention.

FIG. 2 is a side view in partial section of the apparatus of FIG. 1.

FIG. 3 is an enlarged perspective view of a portion of the apparatus of FIGS. 1 and 2.

FIG. 9 is a perspective view of apparatus for holding and positioning a camera.

FIG. 10 is a side view of a portion of the apparatus of FIG. 9.

FIG. 11 is a bottom view of a portion of the apparatus of FIG. 9.

FIG. 12 is a view in partial section of a portion of the apparatus of FIG. 9.

FIG. 13 is a schematic representation illustrating the different movements of the apparatus of the present invention.

FIG. 14 is a view in partial section of an alternate embodiment of a portion of the apparatus of the present invention.

DESCRIPTION OF THE PREFERRED EMBODIMENT

Figure 4:
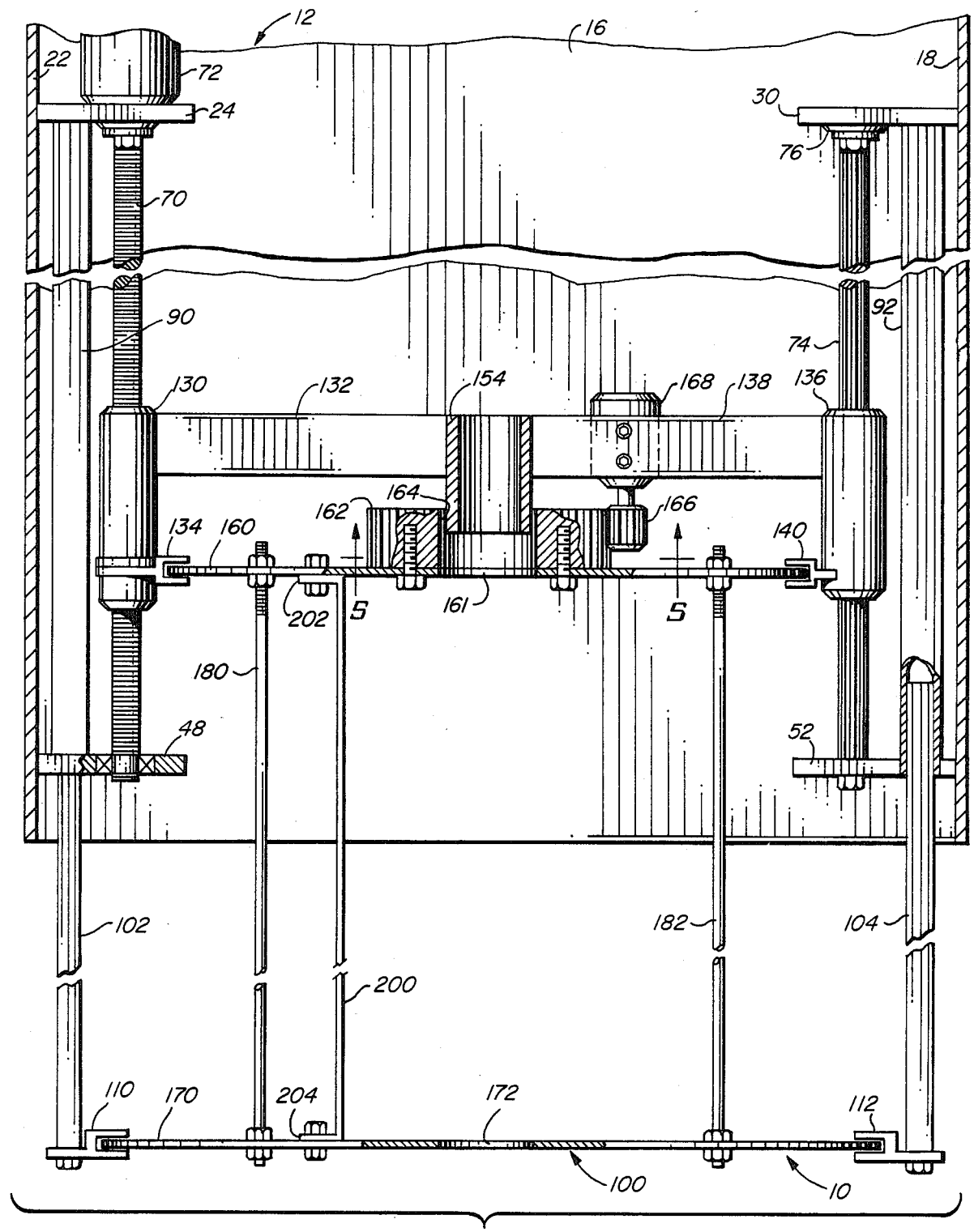
FIG. 4 is an enlarged view in partial section of a portion of the apparatus of the present invention.

FIG. 1 comprises a perspective view of camera holder apparatus 10 of the present invention, and FIGS. 2 and 4 comprise side views in partial section of the camera holder apparatus 10. FIG. 4 is an enlarged detail of a portion of the camera holder apparatus, with the cameras removed for clarity. Reference will be made primarily to FIGS. 1, 2, and 4 for the following overall discussion of the camera apparatus. Details of the apparatus are shown enlarged in FIGS. 3, 5, 6, 7, and 8, and reference will be made specifically to those figures for the appropriate discussion concerning the elements to which they pertain.

The camera apparatus 10 includes an outer housing or cage 12 having a top 14 and four sides 16, 18, 20, and 22. The overall configuration of the outer housing or cage 12 is generally rectangular, with each of the four sides 16 . . . 22 comprising a rectangle, and with the top 14 comprising a square. The housing or cage 12 is secured together, as by welding. The housing 12 is relatively rigid, with its four sides and top comprising solid panels, such as a steel plate, which thus define a relatively rigid housing. If desired, the housing 12 may be secured fixedly in place, such as suspended from a ceiling or secured to a ceiling, or it may be secured to a track, as on an X-Y table, and may thus be movable. This will be discussed in detail below.

Secured to adjacent sides (or side panels) and disposed or located downwardly from the top 14 are four gussets 24, 30, 36, and 42. The gussets are of a generally triangular configuration, with a right angle extending into the corner or juncture of adjacent walls. The gussets are preferably welded to the walls. With a right angle extending onto the walls, the hypotenuse of the triangular plates comprises the third and longest side of the gussets. Extending inwardly from the longest or hypotenuse side of each gusset is a slot, respectively denoted by reference numerals 26, 32, 38, and 44. The slot in each gusset extends rearwardly or inwardly substantially perpendicular to the side or edge (hypotenuse). Each slot is wide enough to accommodate a bearing, or other mounting plate or bracket, for either a splined shaft or a threaded shaft, as will be discussed in detail below.

Adjacent the lower end of the outer housing or cage 12, and substantially parallel to the upper gussets 24, 30, 36, and 42, are four more gussets 48, 52, 56, and 60, respectively. The gussets 48 . . . 60 are substantially the same size as the gussets 24 . . . 42, and they are likewise appropriately secured, as by welding, to the adjacent side walls of the outer housing. The bottom or lower gussets 48 . . . 60 receive the lower mounting plates or bearing assemblies for the threaded or splined shafts so that the shafts are secured between the upper and lower gussets.

A threaded shaft 70 extends between the upper gusset 24 and the lower gusset 48. The threaded shaft 70 is appropriately secured to the two gussets, and is journaled for rotation thereon. Rotary movement of the shaft 70 is accomplished by means of a motor 72. The motor 72 is disposed above the gusset 24, and is appropriately secured thereto. The motor 72 is, of course, also connected to the threaded shaft or rod 70 for imparting rotary motion to it. The motor is preferably a reversible motor, and may be either electric or hydraulic, or any other appropriate type motor. Such motors are well known and understood in the art, and accordingly no elaborate discussion is contained herein concerning the motors and concerning the controls, connections, and the like associated therewith.

Diagonally opposite the threaded shaft 70, with its motor 72, is another threaded shaft 80, with a motor 82 secured thereto. The threaded shaft 80 extends between, and is appropriately secured to, the gussets 36 and 56. The motor 82 is disposed above, and secured to, the gusset 36, in substantially parallel and similar manner as the shaft 70 and its motor 72 with respect to the gusset 24. The shaft 80 is appropriately journaled for rotation in the gussets 36 and 56. The motor 82 is substantially identical to the motor 72, and is synchronized therewith so that the threaded or screw shafts 70 and 80 move substantially simultaneously and at the same rate of speed. The reasons for this, and the effect thereof, will be discussed in detail below.

A splined shaft 74 extends between, and is appropriately secured to, the pair of gussets 30 and 52. Mounting brackets 76 and 78 are used to secure the splined shaft 74 to the gussets 30 and 52, respectively.

Diagonally opposite the splined shaft 74, with respect to the outer housing or cage 12, is another splined shaft 84. The splined shaft 84 extends between and is appropriately secured to the gussets 42 and 60. A pair of mounting brackets 86 and 88 are used to secure the shaft 84 to the gussets 42 and 60, respectively.

The splined shafts 74 and 84 remain fixed in place, and accordingly are not journaled for rotation in their gussets.

Rather, the threaded or screw shafts 70 and 80 are the only shafts of the four which move and accordingly they are appropriately journaled for rotation, as discussed above. The bearing and mounting hardware for the threaded shafts and the splined shafts is well known and understood.

All four shafts are secured to the lower four gussets 48, 52, 56, and 60, which comprise the lower or bottom supports for the shafts. The upper portions of the shafts are fitted to the upper gussets 24, 30, 36, and 42 through the slots 26, 32, 38, and 44, as previously discussed. It will be noted that all four shafts are parallel to each other and are spaced equidistant apart from each other.

The purpose of the four shafts is to guide and move an inner housing or cage 100, which comprises the camera holder housing. In conjunction with the inner housing or inner cage 100 are four guides 90, 92, 94, and 96, which extend between, and are appropriately secured to, the gussets 24, 30, 36, and 42, at the upper ends of the guides, and the gussets 48, 52, 56, and 60, at the lower ends of the guides. Each guide extends between and is secured to one of the four pairs of gussets. The guides are illustrated herein as comprising square tubing. The purpose of the square tubing is to maintain the orientation of the inner housing, and to prevent rotation of the inner housing or cage, except as specifically provided as discussed below.

The guides are hollow, and a rod or tube of the same configuration as the outer guides telescopingly extends into each of the guides. The guides are appropriately secured, as by welding, to the upper gussets and to the lower gussets. However, the guides are secured about an aperture which extends through the lower gussets so as to enable the telescoping rods to extend through the gussets and into their respective guides. This is best shown in FIG. 4. Rods 102, 104, 106, and 108 extend respectively into the guides 90, 92, 94, and 96. The rods 102 . . . 108 are also preferably square rods or tubes which are configured substantially the same as the guides 90 . . . 96, but which are configured substantially the same as the guides 90 . . . 96, but are slightly smaller in cross section so as to allow relative movement between the rods and the guides.

The rods 102, 104, 106, and 108 are respectively connected to brackets 110, 112, 114, and 116, at the lower portions or ends of the rods, remote from where the rods telescope with respect to the guides 90 . . . 96, respectively. The brackets 110 . . . 116 are substantially identical, and each of them extends radially inwardly toward the center of the two housings or cages 12 and 100, which direction is toward the center of the camera holder apparatus 10.

Figure 8:
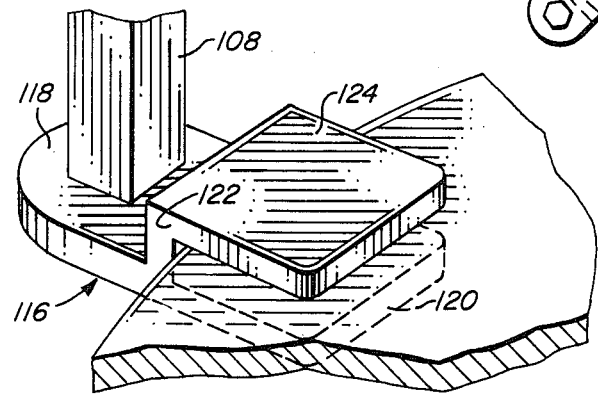
FIG. 8 is an enlarged perspective view of a portion of the apparatus of the present invention taken generally from circle 8 of FIG. 1.

FIG. 8 comprises an enlarged view of the bracket 116, taken generally from circle 8 of FIG. 1. The bracket 116 includes a base plate 118 to which is secured the rod 108. The base plate 118 is generally of a rectangular configuration, with a rounded rear portion adjacent the rod 108. The base plate 118 includes a forward portion 120 extending radially inwardly towards the center of the camera holder apparatus 10, and forwardly or inwardly of the square rod or tube 108. A spacer 122 is secured to the plate 118 and extends upwardly therefrom a short distance, as will be explained below. Extending forwardly from the spacer 122 is an upper plate 124. The upper plate 124 is substantially parallel to the base plate 118, and accordingly also substantially parallel to the forward portion 120 of the plate 118. The upper plate 124 overlies the forward portion 120 of the plate 118. The forward portion 120 and the plate 124 comprise a pair of arms connected by the spacer 122 which define a generally horizontally extending "U" shaped member, the width of the member, or the spacing between the respective plates 120 and 124, which comprise the arms of the member, is sufficient to receive the outer periphery of a circular plate 170 which comprises the lower or base plate of the inner housing or camera cage 100.

Returning again to FIGS. 1, 2, and 4, a bearing unit 130 is disposed about the threaded rod 70, and the bearing unit 130 moves on the threaded rod 70 vertically upwardly and downwardly in response to rotation of the threaded rod 70. Extending radially inwardly from the bearing unit 130 is a support web 132. Also secured to the bearing unit 130 and extending radially inwardly therefrom is a bracket 134. The bracket 134 is spaced apart from the web 132 and is disposed below the web.

A bearing unit 136 is disposed about the splined rod 74, and moves thereon. A radially inwardly extending support web 138 is secured to the bearing unit 136 adjacent the upper portion thereof. Below the web 138, and extending radially inwardly substantially parallel to the web 138, is a bracket 140.

A bearing unit 142, which is substantially identical to the bearing unit 130, is disposed about the threaded rod 80, and moves thereon in response to rotation of the rod 80. A support web 144 extends radially inwardly from the bearing unit 142 to which it is secured. Below the web 144, and substantially parallel thereto, is a bracket 146. The bracket 146 is also secured to the bearing unit 142.

The webs 132 and 144 are in substantial alignment, as are the webs 138 and 150. All four of the support webs 132 . . . 150 extend radially inwardly and are secured to a central cylindrical hub 154. The cylindrical hub 154 is on the longitudinal center line or axis of both the outer housing or cage 12 and the inner housing or cage 100.

The brackets 134 . . . 152 are generally U-shaped, horizontally extending brackets, similar to the brackets 110 . . . 116 connected to the rods 102 . . . 108. The primary difference between the two sets of brackets is in the manner in which they are fastened to the rods or the bearing units, as applicable.

A circular upper plate 160 extends into the brackets 134 . . . 152, and is appropriately supported therein for rotation. Secured to the upper side of the plate 160 is a gear 162. The gear 162 includes a central aperture or bore 164, which is coaxially aligned with a mating central hole 161 in the plate 160 and with the hub 154. The gear 162 is appropriately secured to the plate 160 for unitary movement therewith. In FIG. 4, the gear 162 is shown secured to the plate 160 by appropriate screws (bolts).

A pinion gear 166, secured to the output shaft of a reversible motor 168, meshes with the gear 162. The motor 168 comprises a drive motor for rotating the inner cage or camera housing 100 through the gears 166 and 162. The motor 168 is appropriately secured to the web 138, as best shown in FIG. 4.

Spaced apart from the upper plate 160 is a lower plate 170. The plate 170 extends into the brackets 110 . . . 116 and is appropriately journaled for rotary movement therein. The plates 160 and 170 are circular and they move together as a unit on the inner cage 100. The plate 170 includes an aperture or hole 172 which extends through the plate in general coaxial alignment with the hole 161 of the upper plate 160.

Four tie rods 180, 182, 184, and 186 extend between and are appropriately secured to the upper and lower plates 160 and 170, respectively. The tie rods 180 . . . 186 secure together the plates 160 and 170 of the inner cage. While the plates 160 and 170 are an integral part of the inner cage or housing 100, and move therewith, vertically upwardly and downwardly, the plates, as secured together by the tie rods 180 . . . 186, also rotate in response to the reversible motor 168 through the gears 162 and 166.

The circular plates 160 and 170 are coaxially aligned and substantially parallel to each other. The tie rods 180 . . . 186, which are shown in FIG. 4 as being secured by bolts to both plates, secure the plates together and define the fixed distance or spacing between the plates. As best indicated in FIGS. 2 and 4, the diameter of the plates 160 and 170 are not the same, with the diameter of plate 170 being greater than the diameter of plate 160.

The plate 160 is journaled for rotation in the brackets 134, 140, 146, and 152, which are secured to the bearing units disposed on the threaded and splined rods which comprise part of the outer housing or cage 12. The plate 170 is journaled for rotation in the brackets 110, 112, 114, an 116, which are disposed at the lower end of, and secured to, the rods 102, 104, 106, and 108, respectively.

The inner housing or cage 100 moves vertically upwardly and downwardly, with reference to FIGS. 1 and 2, in response to rotation of the threaded rods 70 and 80, which are in turn moved by the motors 72 and 82, respectively. The movement referred to as "vertical" or as "vertically upwardly and downwardly" is an axially longitudinal movement of the inner housing 100 relative to the outer housing or cage 12. As will be discussed below, the cage 12 may itself be mounted for movement, thus allowing three axis movement for the cage 12.

The splined rods 74 and 84 act as guide and alignment rods to maintain the inner housing or cage 100 in alignment as the threaded rods turn. The inner cage 100, which is secured to the threaded and splined rods through the bearing units 130, 136, 142, and 148, is guided in its vertical movement not only by the threaded and splined rods and the bearing units associated therewith, but also by virtue of the rods 102, 104, 106, and 108, which move in a telescoping fashion within the guide rods 90, 92, 94, and 96, respectively. The outer guide rods 90 . . . 96 are in turn secured to and extend between the corner gussets, both upper and lower, of the outer housing or outer cage 12.

The purpose of the vertical movement, both up and down, of the inner housing or inner cage 100, and of the rotary movement of the inner cage 100 about its vertical axis, is for the specific purpose of providing the appropriate movement for a pair of cameras 210 and 220, which are secured to the inner housing or cage 100 by means of a camera tray 200 which extends between and is secured to the upper and lower plates 160 and 170, respectively. The cameras 210 and 220 are shown in FIGS. 1, 2, and 3, but the cameras have been omitted from FIG. 4, for purposes of clarity, although the camera tray 200 is shown in FIG. 4.

The camera tray 200 is, as illustrated, a flat, planar tray which includes a pair of flanges 202 and 204 secured to and disposed substantially perpendicular to the tray 220 for securing the tray, and the cameras secured thereto, to the plates 160 and 170. The flange 202 is appropriately secured, as by bolts, to the plate 160, while the flange 204 is appropriately secured, as by bolts, to the lower circular plate 170. It will be noted that the length or height of the tray 200 is substantially the same as the distance between the plates 160 and 170. This allows the camera tray 200 to be secured in a relatively simple manner to the inner cage 100.

As best shown in FIG. 3, which comprises a perspective view of the camera tray 200 showing the cameras 210 and 220 secured thereto, the cameras are mounted in a side-by-side orientation. Camera 210 is preferably a film camera, while camera 220 is preferably a television camera. The camera 210 includes a lens assembly 212. As best shown in FIGS. 1 and 2, a lens barrel 214 of the lens assembly 212 extends through the aperture 172 in the lower plate 170 for photographing whatever is below the camera holder apparatus 10. The apparatus 10 may conveniently be used in conjunction with an animation table, such as shown in U.S. Pat. No. 4,278,332, issued to me on July 14, 1981, or the like, for making animated movies, or it may be used in conjunction with models, and the like, for special effects, etc.

The television camera 220 includes a fiber optics bundle 222 extending from the television camera to the lens assembly 212. The fiber optics is connected within the lens housing to the lens structure of the film camera 210, and accordingly, the image through the camera lens 214 is relayed to the television camera 220. In this manner, a viewer watching a closed circuit television set may view the same image which the camera 210 is recording on film.

Electrical control signals for the cameras 210 and 220 are transmitted through appropriate cables or conductors, identified in FIG. 3 by reference numerals 218 and 228 for the cameras 210 and 220, respectively. As best shown in FIG. 2, the electrical conductors 218 and 228 extend upwardly from the cameras to the aperture 161 in the plate 160 (see also FIG. 4), the aperture or bore 164 of the gear 162, through the central, cylindrical hub 154, and then vertically within the outer cage or housing 12. The conductors or cables are then appropriately secured in a well known manner, and they extend to an appropriate control panel, or the like.

Figure 5:
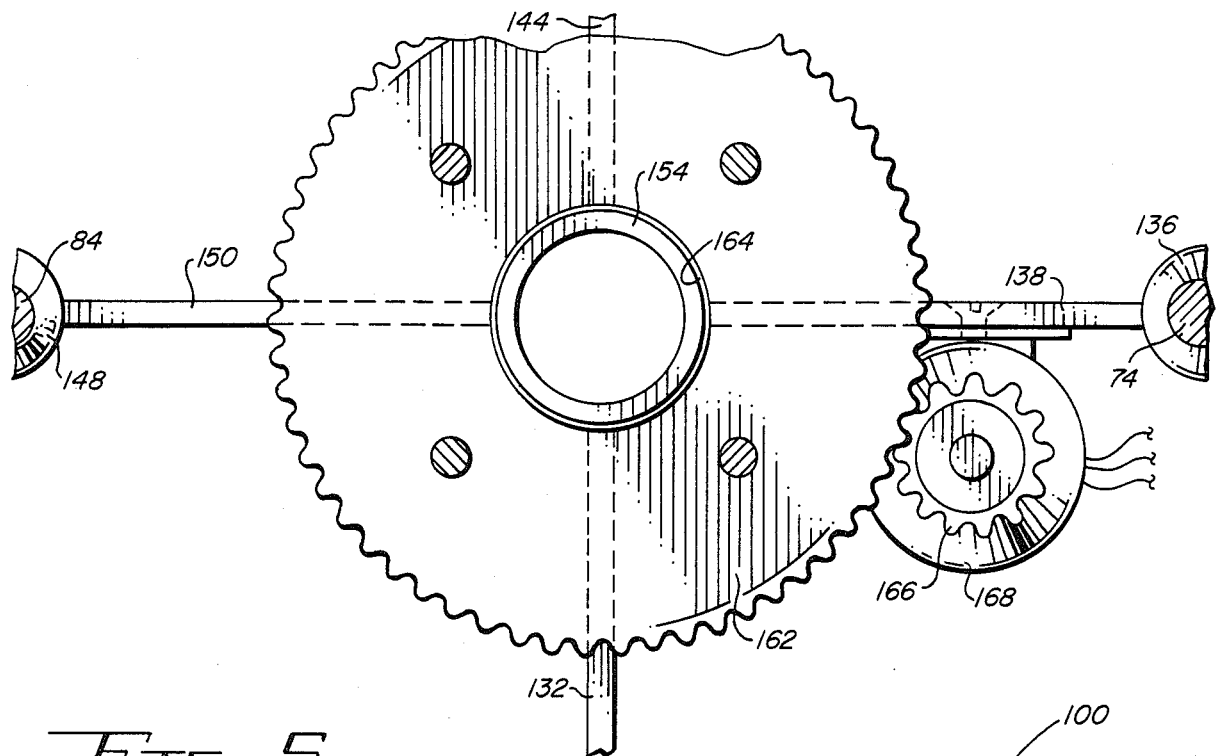
FIG. 5 is an enlarged plan view of a portion of the apparatus of the present invention.

Rotation of the inner cage 100 is accomplished by the reversible motor 168, as discussed above. The output shaft of the motor 168 is secured to the pinion gear 166, which meshes with the larger gear 162. The gear 162 is appropriately secured as by screws or bolts, to the plate 160. The meshing of the gears 166 and 162 is best shown in FIG. 5, which comprises a bottom view of the gears 162 and 166, the motor 168, and the ribs or webs 132, 138, 144, and 150, associated with the motor 168 and with the gears.

The motor 168 is secured to the web 138 and accordingly moves vertically therewith. The web 138 extends between the cylindrical hub 154 and the bearing assembly 136 for the splined shaft 74. The hub 154, which is disposed on the center line axis of the camera holder apparatus 10, and accordingly along the center line of the outer housing or cage 12, and the inner housing or cage 100, is connected to the four webs 132, 138, 144, and 150, and moves vertically on the threaded and splined shafts in response to rotation of the threaded shafts 70 and 80. With the gear 162 symmetrically disposed about the center longitudinal (vertical) axis of the camera holder apparatus 10, the inner cage or camera housing 100 rotates about the longitudinal axis of the camera apparatus 10.

Figure 6:
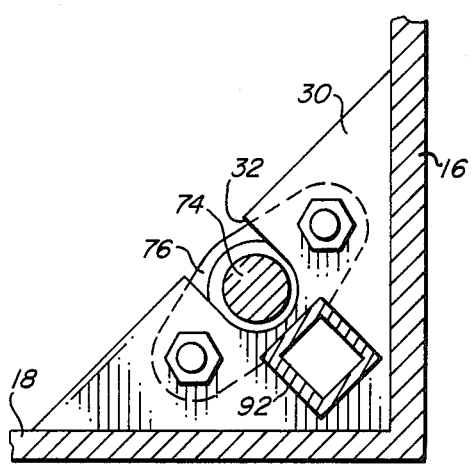
FIG. 6 is a view in partial section of the apparatus of the present invention taken generally along line 6—6 of FIG. 2.

The securing of the four shafts 70, 74, 80, and 84 to the upper gussets is illustrated in detail in FIG. 6, which comprises an enlarged view in partial section of the gusset 30 secured to the walls 16 and 18 at their juncture. The splined shaft 74, which is representative of all four shafts, is secured to mounting plate 76, which is in turn secured appropriately, as by bolts and nuts, to the gusset 30. The primary difference between the splined rods 74 and 84 and the threaded rods 70 and 80, with respect to their mounting plates, is in the absence or presence of bearings for allowing the threaded rods to rotate. The threaded rods 70 and 80 are journaled for roation in their mounting plates, and accordingly require bearings, while the splined rods 74 and 84 are not journaled for rotation, but rather are fixedly secured to their mounting plates, and do not require bearings. In FIG. 6, the mounting plate 76 does not include a bearing structure for the splined rod 74, and accordingly there is no rotary or relative motion between the rod 74 and the mounting plate 76.

The splined rod 74 extends upwardly through the mounting plate 76 and into the slot 32 of the gusset plate 30. If desired, a second mounting plate (not shown) may also be secured to the splined rod or shaft 74 and disposed on the top of the gusset 30, substantially parallel to the lower mounting plate 76. The lower mounting plate 76 is disposed against the bottom of the gusset 30 and is appropriately secured thereto.

The square guide tubing 92 is shown in FIG. 6 as also being secured to the gusset 30, adjacent the recess 32 and accordingly adjacent the shaft 74. The guide tubing 92 is shown as square tubing, as discussed above, for purposes of alignment of the inner housing or cage 100. The square tubing also helps prevent rotation or rotary movement of the rods which extend into the guide tubing as the inner housing or cage 100 rotates relative to the outer housing or outer cage 12.

Figure 7:
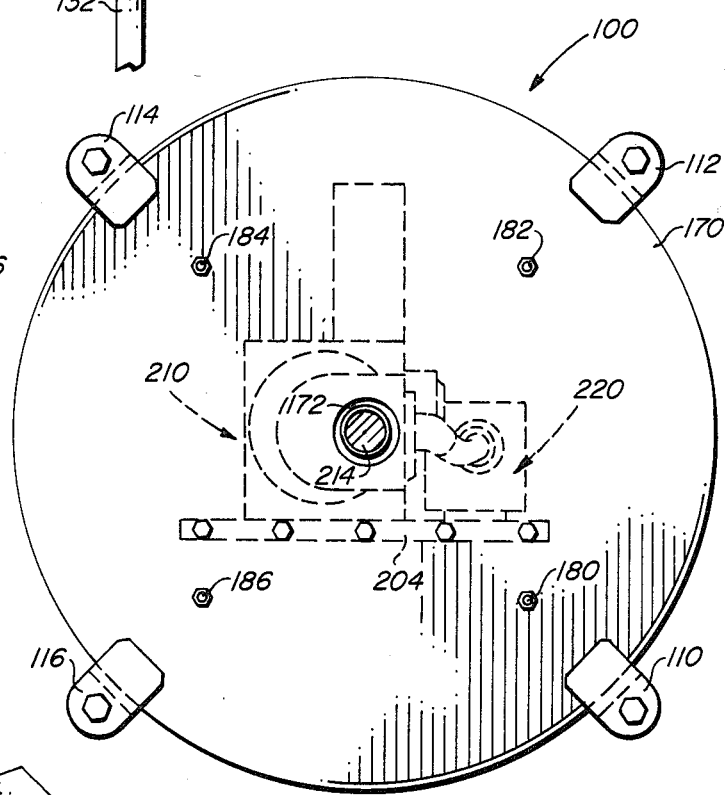
FIG. 7 is an end view of the apparatus of the present invention taken generally along line 7—7 of FIG. 2.

FIG. 7 comprises an end view of the inner cage or housing 100, taken generally along line 7—7 of FIG. 2. The circular plate 170 is shown disposed within the brackets 110 . . . 116. The brackets 110 . . . 116 are in turn secured to the guide rods 102 . . . 108, as discussed above. Nuts are shown securing the tie rods 180 . . . 186 to the plate 170. Heads of bolts are shown securing the flange 204 of the camera tray or plate 200 also to the plate 170.

The lens barrel 214 of the camera 210 is shown extending through the aperture 172 of the plate 170. The lens barrel 214 is disposed coaxially with the aperture 172, which is in turn coaxially centered with respect to the plate 170 and accordingly to the inner cage 100 and the outer cage 12. The camera lens barrel 214 therefore rotates coaxially with or about the longitudinal axis of the camera holder 10 as the plate 170 of the inner housing 100 rotates in response to rotational movement of the gear 162 (see FIG. 5) secured to the plate 160.

By controlling the vertical and rotational movement of the inner cage or housing 100, the cameras 210 and 220 may be positioned, as desired, for photographing an object or objects disposed below or in front of the camera holder apparatus 10. The cameras move vertically upwardly and downwardly, in the Z plane, in response to the rotation of the threaded shafts 70 and 80, and the cameras rotate in the X-Y plane in response to rotation of the gears 162 and 166. With the motors connected to the shafts and to the gear 166 being reversible motors, the cameras may move and may be positioned simultaneously or sequentially as desired in the two planes.

The rotation of the plates 160 and 170, in response to actuation of the motor 168, may take place independently of the linear movement of the inner housing or cage 100, or it may take place simultaneously therewith, as desired by the operator of the apparatus 10. Thus, there may be either sequential or simultaneous movement, as desired.

In FIG. 2, electrical conductors 218 and 228 are shown extending out of the camera apparatus 210. In previous discussion herein, it has been indicated that the conductors may be connected appropriately and in a well-known manner with a control panel, etc. The primary purpose of the conductors 218 and 228 is for controlling the cameras 210 and 220. However, if it is desired that the cameras 210 and 220 rotate in a high speed manner for purposes of special effects, etc., the conductors 218 and 228 may preferably be secured to appropriate slip rings, conductive discs, etc., that will allow high speed rotation of the camera plate 200 and the plates 160 and 170 in reversible directions, as desired. Such electrical connectors are well known and understood and are accordingly not illustrated herein.

High speed rotation of the cameras for special effects purposes may be accomplished by appropriate control of the motor 168 in conjunction with control of the cameras 210 and 220, particularly of the operation of the camera 210. Such high speed rotation of the cameras may be accomplished, either simultaneously or sequentially with respect to the linear movement of the inner cage or housing 100, or quite independently of the movement of the inner cage or housing 100.

FIG. 9 is a perspective view of the camera holder apparatus 10 secured to a base unit 370. FIG. 10 is a side view of a portion of the apparatus of FIG. 9, illustrating the operation of a portion of the base unit 370 and the camera holder apparatus 10. FIG. 11 is an enlarged bottom view of a portion of the base unit 370. FIG. 12 is a side view of another portion of the base unit 370. For the following discussion, reference will be made primarily to FIGS. 9, 10, 11, and 12.

With reference to FIGS. 1-8, details of the operation of the camera holder apparatus 10 have been discussed. The camera holder apparatus 10 may be fixed in position, either vertically, as generally discussed in conjunction with FIGS. 1-8, or it may be secured substantially horizontally, as desired. Moreover, the vertical or horizontal movement of the camera holder or housing apparatus 10 may be either fixed in place or movable, as on a track or on an X-Y table. In the alternative to a fixed track, or ordinary X-Y table mounting, the camera holder apparatus 10 may be secured to a base unit 370 which includes provisions for an X-Y table 300 secured to a pivotable plate 320. The pivotable plate 320 is in turn secured to a rotating plate 350. The X-Y table 300 and the plates 320 and 350 are all secured to the base unit 370. As envisioned in FIGS. 1-12, the camera holder apparatus 10 may be used on location or it may be disposed in a studio, thus providing virtually unlimited flexibility in usage.

In FIG. 9, the camera holder apparatus 10, illustrated as a relatively elongated rectangular unit, which is the general outline of the outer cage 12, is shown secured to an X-Y table 300. Details of the X-Y table are well known and understood, and are thus not illustrated in detail. The employment of the X-Y table allows the camera holder apparatus 10 to be moved in two directions, in X-Y planar directions, and at the same time still allows for the movement discussed above in conjunction with FIGS. 1-8, namely linear movement of the inner cage or housing 100 and rotary movement of the cameras 210 and 220 on the plate 200 secured to the plates 160 and 170. Accordingly, there is three-way movement of the camera provided for: X-Y movement, linear movement, and rotary movement. All three types of movements may be accomplished independently of each other, and they may be either simultaneous or sequential, as desired.

The X-Y table 300 is secured to a tiltable or pivotable plate 320. The plate 320 is secured to a rotating plate 350 by means of hinge assembly 322. This is shown in both FIGS. 9 and 10. The plate 320 is tiltable or pivotable on the hinge 320, and thus on the plate 350. Movement of the plate 320 is accomplished by means of a motor 324 which is secured to the bottom of the plate 320. The output of the motor 324 is transmitted to a gear box 326. The output from the gear box 326 is in turn transmitted through a universal joint 328 to a screw 330. The screw 330 extends through a nut 332 which is fixed with respect to the plate 350 by means of a pivoting hinge element 334. The nut 332 is in turn secured to the plate 350. This is best shown in FIG. 10. The screw 330 defines a jack screw for pivoting or tilting the plate 320, and thus the X-Y table 300 secured thereto and the camera holder apparatus 10 secured to the X-Y table 300. Obviously more motor and screw combinations may be used if required to move the plate 320.

By virtue of the pivoting action of the plate 320, a fourth movement of the cameras is possible. In addition to the rotational and linear movement of the cameras, and of the X-Y movement of the table 300, a tilting movement is also possible. Again, as with the other movements, the tilting movement may be accomplished simultaneously, or sequentially, with the other movements, and completely independently thereof.

The plate 320 is pivotally secured to the plate 350 by the hinge connection 322. The plate 350 is a round or circular plate appropriately secured to the base 370. The plate 350 includes an aperture 352 which accommodates or receives the plate 320 and its motor and screw elements. The aperture 352 is shown in both FIGS. 9 and 10.

The plate 350 rotates on the base unit 370. The base unit 370 is preferably fixed in place, though it need not be, and, as illustrated in FIG. 9, is relatively square or rectangular and provides support for the rotating plate 350, the tilting plate 320, the X-Y table 300, and the camera holder apparatus 10.

The base 370 includes a top plate 372. A circular aperture 374 extends through the plate 372 and receives the rotating plate 350. The details of the support and rotation of the plate 350 are best illustrated in FIGS. 11 and 12. FIG. 11 is a bottom view of a portion of the plate 350 and the top plate 372. FIG. 12 is an enlarged view of a portion of the plate 350 and the top plate 372.

On the bottom of the plate 350, and disposed adjacent to, and inwardly from, the outer periphery thereof, is a circular gear 354. At the outer periphery of the rotating plate 350 is a bearing lip 356. As best shown in FIG. 12, the bearing lip 356 includes two bearing surfaces, namely an outer bearing surface 358 and a lower bearing surface 360. As shown in FIG. 12, the large ring gear 354 extends downwardly from the plate 350 and is spaced inwardly, radially, from the bearing lip 356.

Rotation of the plate 350 is accomplished by means of a motor 380 which is secured to the base 370, as shown in FIG. 11. The motor 380 includes a gear box 382 secured thereto. The gear box 382 includes an output shaft 384 extending outwardly therefrom. On the end of the output shaft 384 is an output pinion gear 386. The pinion gear 386 meshes with the gear 354 on the outer portion of the rotating plate 350.

The electric motor 380 is preferably a reversible motor, which allows the plate 350 to be rotated either clockwise or counterclockwise, as desired. Although only a single motor 380 is shown, it will be understood that more than one motor, with appropriate gear boxes and pinion gears, as required, may be used to rotate the plate 350.

For supporting the plate 350, a plurality of bearings are used. The bearings are of two kinds, as best shown in FIG. 12. A plurality of vertically adjustable support bearings 390 and a plurality of laterally adjustable bearings 392 are used. Both types of bearings are appropriately secured to the base 370. As shown in FIG. 12, the bearing elements 392 may be directly secured to the plate 372.

The bearing elements 390 are vertically adjustable so as to provide a substantially level bearing surface on which the plate 350 rotates. A double headed arrow shows on the bearing element 390 in FIG. 12 indicates that the support bearing 390 is adjustable vertically upwardly and downwardly.

The double-headed arrow on the bearing 392 on FIG. 12 indicates that the bearing 392 is laterally or horizontally adjustable. The bearing 392, and the other required bearing elements 392, not shown, are spaced apart on the inner periphery of the aperture 374 to provide lateral or sideways bearing surfaces for the plate 350. The lateral or radial adjustment of the bearing elements 392 allows the plate 350 to be supported substantially concentrically with respect to a center axis of rotation for the plate 350.

By rotating the plate 350, another movement is introduced for the cameras disposed wihin the camera housing unit 10. The rotation of the plate 350 allows for a combination of rotary movement as well as tilting movement and X-Y movement of the camera housing apparatus 10 through the plate 350, the plate 320, and X-Y table 300, respectively.

The various movements are illustrated in FIG. 13, which is a schematic representation of the either simultaneous or sequential, but all independent movements, provided by the apparatus of the present invention. The X, Y, and Z directions are illustrated in FIG. 13, with double-headed arrows indicating the possible movements of the apparatus of the present invention. In addition to the planar movements in the X, Y, and Z directions, rotary movement and tilting movement may also be accomplished.

Referring again to FIG. 9, two control elements are illustrated. A control system 400 is schematically represented as being connected to the camera apparatus by means of a control cable 402. The control system discussed above in conjunction with the camera holder apparatus 10 may be included in a console as part of the control system 400. In addition, the control system 400 may include a remote television monitor for monitoring the television camera 220. The cable 402 includes appropriate power/control conductors for the various motors discussed above and for the cameras 210 and 220.

For precision control or positioning of the various units involved, as discussed herein, a computer 410, connected to the control system 400 by means of cable system 412, may also be included. The computer 410 may control not only the movement of the various portions of the overall system, as illustrated in FIG. 9, but may also control the actuation of the cameras. The use of the computer 410 may accordingly be used to position not only the camera holder apparatus 10 with respect to the base 370 by controlling the rotation of the plate 350, the tilting of the plate 320, movement of the X-Y table 300, linear movement of the cage 100, and rotation of the camera tray 200 as secured to the plates 160 and 170, but also actuation of the cameras themselves. Thus, for example, if the cameras are rotated at a high speed through actuation of the motor 168 (see FIGS. 2 and 4), the computer 410 may control the operation of the shutter of the camera 210. The operation of the shutter of the camera 210 may be accomplished in coordination with high speed rotation of the cameras for special effects purposes. That is, the camera 210 may not be running constantly. Rather, during high speed rotation, the camera shutter may be operated only at selected intervals, depending on the rotational speed, and thus the precise positioning, of the camera with respect to an object being photographed.

As discussed above, it may be seen that the apparatus of the present invention allows virtually unlimited types of photography, animation, special effects, or ordinary photography, as desired by the users thereof. The sequential or simultaneous movements possible with the apparatus of the present invention provide virtually unlimited flexibility for studio filming, location filming, animation, or combinations thereof without removing the cameras from the housing apparatus 10.

By utilizing the computer 410 to control the positioning of the cameras 210 and 220, the rotation of the plate 350, tilting of the plate 320, movement of the X-Y table 300, linear movement of the inner cage or housing 100, and also rotation of the camera tray 200, the precise indexing or locating of the camera 220 with respect to any desired object may be accomplished. Moreover, if the camera holder apparatus 10 is removed from the X-Y table 300 and transported to another location, filming may be accomplished at a remote location using any of several types of bases for the camera housing 10. For example, another X-Y table at a remote location may be used, a wall may be used, or a ceiling or platform may be used, with tracks or X-Y tables thereon, as desired.

In addition to the above, the camera housing apparatus 10 may be located or secured to a truck or the like for filming while moving on the ground, to an airplane or helicopter for aerial filming, or other type of platform or unit for various other kinds of photography. At the conclusion of such filming, the camera holder apparatus 10 may be returned to the X-Y table 300 and to the other element secured to the base 370 for continued filming. It will be noted that all of this may be accomplished without removing the camera 210 from the camera tray 200, thus allowing continued photography after the return of the camera apparatus 10 to the base 370 without altering the initial indexing of the camera apparatus according to the computer controls. The set-up and indexing time is accordingly obviated. Obviously, such ability decreases the cost of filming to a substantial degree, due to the ability of the housing apparatus 10 to be removed and replaced relative to a fixed, predetermined location, all under the control of the computer 410.

While the computer control of camera action is well known and understood, there has not heretofore been a computer controlled camera system with such great flexibility in the virtually unlimited ability of a camera holder, with a camera, to film on location in a studio, for special effects, or for animation.

FIG. 14 is a view in partial section of high speed camera cage apparatus 450. As discussed above, there may be applications for high speed rotation of a camera. In such case, the camera tray 200, and the structural elements associated therewith, as disposed within the inner cage 100, may not be satisfactory. Accordingly, the apparatus 450 of FIG. 14 may be substituted for the camera tray 200 and the associated elements, as shown particularly in FIGS. 1-5 and 7.

There is shown in FIG. 14 a pair of frame members 452 and 454, which correspond to the frame members 102 . . . 108 of the inner cage 100, as shown in FIGS. 1 and 2. The frame members 452 and 454, and other frame members, not shown, which may be required, would be secured to and movable with the inner cage 100 as the inner cage 100 moves in a linear manner with respect to the outer cage or housing 12.

Secured to the structural frame members 452 and 454 are a pair of circular or sleeve bearing elements 456 and 458. The bearing elements 456 and 458 receive a pair of end plates 460 and 464. The end plates 460 and 464 are journaled for high speed rotation in the bearing elements 456 and 458.

The plate 460 includes an aperture 462 extending therethrough concentrically with respect to the axis of rotation of the plate 460. The aperture 462 has a diameter greater than the lens barrel of a camera 472 which is appropriately secured to a camera mounting or support plate 470. The mounting plate 470 is in turn appropriately secured to a camera mounting or support plate 470. The mounting plate 470 is in turn appropriately secured to, for joint rotation with, the end plates 460 and 464. The lens of the camera 472 is, of course, on the axis of rotation of the cage apparatus 450. A motor 468 rotates the plates 460 and 464, and accordingly the plate or tray 470 and camera 472, through a shaft 466. The shaft 466 extends from the motor 468 to the plate 464.

Appropriate electrical connections, not shown, for either the motor 468 or the camera 472, will extend from the high speed camera apparatus 450 to control apparatus, such as the control system 400 shown in FIG. 9. For high speed rotation, slip rings or other appropriate and well known elements will be required for interconnecting the camera 472 to the appropriate electrical connectors. If desired, radio control of the camera 472 may be used.

It will be noted that the camera 472 is portrayed as being relatively long. It will be understood that for high speed rotation, the effect of centrifugal force must be taken into consideration. Accordingly, it is highly desirable to have as light a weight as possible involved with respect to the apparatus 450, and also to have as short a radius of rotation as is practical.

While only a single camera 472 is shown in FIG. 14, it will be understood that a television monitoring camera, such as best shown in FIG. 3, may also be included. Also not shown in FIG. 14 is appropriate counterweight or counterbalance elements, which may be required.

It will be noted that the bearings 456 and 458 preferably extend from a full 360° circle and are substantially concentrically disposed about the spaced apart end plates 460 and 464. It will also be noted that the high speed camera apparatus 450 does not include gear elements, such as shown in FIGS. 2, 4, and 5. The elimination of such gear elements, coupled with computer control of the camera 472, even through radio control, allows for the very precise angular positioning of the camera 472 about its axis of rotation with respect to taking sequentially framed pictures. With the camera operating at a predetermined speed, and with the operation of the shutter under appropriate computer control, the photographing of a fixed object may appear to rotate by appropriate sequential framing.

The outer housing or cage 12 has been discussed above, and is shown in the drawings, as being mounted on one end. It is obvious that the housing may also be mounted parallel to its longitudinal axis, or along its side structural members, such as the plates 16 . . . 22, if desired. Such side mounting may be preferable if the apparatus 10 is secured to an aircraft or helicopter or to a Chapman crane.

In the above discussion, two kinds of cameras have been referred to, namely a conventional film type camera and a television camera. Thus, it is immaterial what type of medium is used to record images, whether on conventional film or on a magnetic or electronic medium. The cameras shown and discussed may be any desired type.

For photography purposes, an image may be filmed directly by the cameras 210, 220, or 472, or an image may be projected onto a desired medium from a projector, or from reflected light, as from a screen, or from scattered laser light, as in holography, or otherwise.

Another type of light, polarized light, may also be used. This is done by placing rotating polarized filters between a light source and a rotating camera. The degree or extent of polarization may be varied to produce a desired effect. Rotation of the filters may be synchronized with the rotation of the camera to produce a stroboscopic effect.

For special effects, as when a camera is rotated at high speed, the computer control discussed above will obviously be used. Different special effects may result when different types of lighting are used with high speed camera rotation. For example, for some effects, direct photography may be desired. For other effects, laser light may be preferred, or image projection may be preferred for other types of special effects. Polarized light may be desired for certain special effects. Varying the degree or extent of polarization during the dual high speed rotation of filters and cameras, and while photographing, or between photographing sequences, may also be desired for certain other special effects.

The term "high speed rotation" as used herein may be contrasted with the prior art rotation, which is characterized as relatively slow camera rotation. The rotational speed of prior art cameras is limited to about fifty or sixty revolutions per minute, and is typically only a few rpm, such as two or three. The apparatus of the present invention, particularly as discussed in conjunction with FIG. 14, is characterized by rotational speeds of several hundred revolutions per minute, and typically about one thousand or more revolutions per minute. Thus, the rotational speeds discussed herein are relatively high when compared with the prior art speeds.

The relatively slow prior art camera rotation is used primarily to provide artistic or aesthetic effects. For example, the relatively slow camera rotation may be used to produce rocking motion, flipping motion, etc.

The relatively fast or high speed rotation of the present apparatus has different purposes from the relatively slow rotation of the prior art. Precision registration, special effects, and effects on film emulsion, when film is used, are among the purposes of the relatively high speed camera rotation of the present apparatus. Other purposes of the high speed camera rotation include the elimination of problems of traditional single frame animation, such as flicker, digital to analog information translation required for operation of stepping (or stepper) motors and mechanical elements such as gears, lasers, and wheels.

The problem of flicker is the direct result of distinct and sharp images only apparent upon projection of movies, especially stop motion animations, such as cel, puppet, and model animations. Streaking eliminates flicker in films taken at continuous taking or framing speeds of twenty-four to ten thousand or so frames per second. Controlling streaking, therefore, is desirable in model animation to eliminate flicker.

The high speed camera rotation of the apparatus of the present invention provides controlled streaking through angular displacement on the axis of rotation and the filming during rotation, all as controlled by the computer 410.

The "special effects" which may result from the high speed camera rotation include three dimensional images, dispersion of light with respect to the color spectrum, and other effects not now feasible with prior art camera apparatus.

The term "plate" has been used in conjunction with the number of circular elements, such as the "plate 350", the "plates 160 and 170" and the "plates 460 and 464". Moreover, such "plates" are shown in the drawing as being solid. However, it is obvious that appropriate frameworks having outer peripheral portions for contact with appropriate bearing surfaces, etc., may be used. Such open frameworks may be desirable for purposes of weight saving, ease of fabrication, etc.

What is claimed is:

1. Apparatus for holding and positioning a camera, comprising, in combination:
    base means;
    first plate means rotatable on the base means;
    second plate means pivotally secured to and movable with the first plate means;
    outer housing means secured to and movable with the second plate means, including
        fixed shaft means,
        rotating shaft means spaced apart from and aligned parallel to the fixed shaft means, and
        means for supporting the fixed shaft means and the rotating shaft means;
    inner housing means disposed in the outer housing means and movable relative thereto in response to rotation of the rotating shaft means, including
        bearing means secured to and axially movable on the fixed shaft means and the rotating shaft means, and
        third plate means secured to the bearing means, including an upper plate and a lower plate spaced apart from each other and secured together for longitudinal movement and for rotational movement relative to the inner housing means;
    camera means secured to the third plate means and movable therewith; and
    motor means, including
        first motor means for rotating the first plate means,
        second motor means for pivoting the second plate means,
        third motor means for moving the inner housing means relative to the outer housing means by rotating the rotating shaft means,
        fourth motor means for rotating the third plate means within the inner housing means and relative to the outer housing means; and
        control means for controlling the motor means for moving and positioning the camera means.

2. The apparatus of claim 1 in which the outer housing means includes guide means, and the inner housing means includes rod means guided by the guide means as the inner housing means moves relative to the outer housing means.

3. The apparatus of claim 2 in which the rod means includes first bracket means for supporting the third plate means during axial and rotational movements.

4. The apparatus of claim 1 in which the fixed shaft means includes a splined shaft for guiding the inner housing means, and the first motor means includes a motor for rotating the threaded shaft for moving the inner housing means axially on the threaded shaft and the splined shaft.

5. The apparatus of claim 4 in which the bearing means includes a first bearing secured to the splined shaft and to the inner housing means for supporting the inner housing means for axial movement on the splined shaft.

6. The apparatus of claim 5 in which the bearing means further includes a second bearing secured to the threaded shaft and to the inner housing means for supporting the inner housing means and for moving the inner housing means axially as the threaded shaft rotates.

7. The apparatus of claim 1 in which the second plate means further includes X-Y table means, and the outer housing means is secured to the X-Y table means.

8. The apparatus of claim 1 in which the third plate means is rotated by the fourth motor means at a relatively high rotational speed.

9. Holder apparatus for rotating a camera at relatively high speed to provide special effects, comprising, in combination:

housing means, including frame members;

plate means a pair of axially spaced rotatably secured to the frame members of the housing means;

a camera plate secured to and rotatable with the plate means;

a camera secured to the camera plate;

motor means secured to, the plate means for rotating the pair of plate means at relatively high speed; and control means for controlling the motor means and for controlling the camera to provide special effects.

10. The apparatus of claim 9 in which the housing means further includes an outer housing, and the frame means is secured to the outer housing and is longitudinally movable with respect to the outer housing.

* * * * *